United States Patent
Tsuneki et al.

(10) Patent No.: US 10,564,619 B2
(45) Date of Patent: Feb. 18, 2020

(54) MACHINE LEARNING DEVICE, SERVO CONTROL DEVICE, SERVO CONTROL SYSTEM, AND MACHINE LEARNING METHOD

(71) Applicant: FANUC CORPORATION, Yamanashi (JP)

(72) Inventors: Ryoutarou Tsuneki, Yamanashi (JP); Satoshi Ikai, Yamanashi (JP); Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/919,456

(22) Filed: Mar. 13, 2018

(65) Prior Publication Data
US 2018/0267499 A1    Sep. 20, 2018

(30) Foreign Application Priority Data
Mar. 15, 2017 (JP) .................. 2017-049608

(51) Int. Cl.
*G05B 19/31* (2006.01)
*G06N 20/00* (2019.01)
(Continued)

(52) U.S. Cl.
CPC ..... *G05B 19/318* (2013.01); *G05B 19/41855* (2013.01); *G06F 15/76* (2013.01); *G06N 20/00* (2019.01); *Y02P 90/02* (2015.11)

(58) Field of Classification Search
CPC .................. G05B 19/416; G05B 19/19; G05B 2219/41205; G05B 2219/42114;
(Continued)

(56) References Cited

U.S. PATENT DOCUMENTS 4,947,336 A * 8/1990 Froyd .................... G05B 19/41
                                                    700/188
5,751,585 A * 5/1998 Cutler .................. B23K 26/083
                                                    318/571
(Continued)

FOREIGN PATENT DOCUMENTS

JP          3-15911      1/1991
JP       2003-061377    2/2003
(Continued)

*Primary Examiner* — Rina I Duda
(74) *Attorney, Agent, or Firm* — Wenderoth, Lind & Ponack, L.L.P.

(57) ABSTRACT

A machine learning device performs machine learning with respect to a servo control device including a velocity feedforward calculation unit. The machine learning device comprises: a state information acquisition unit configured to acquire from the servo control device, state information including at least position error, and combination of coefficients of a transfer function of the velocity feedforward calculation unit; an action information output unit configured to output action information including adjustment information of the combination of coefficients included in the state information, to the servo control device; a reward output unit configured to output a reward value in reinforcement learning based on the position error included in the state information; and a value function updating unit configured to update an action value function on the basis of the reward value output by the reward output unit, the state information, and the action information.

9 Claims, 10 Drawing Sheets

(51) Int. Cl.
*G06F 15/76* (2006.01)
*G05B 19/418* (2006.01)

(58) Field of Classification Search
CPC ........... G05B 2219/36176; G05B 2219/37297; G05B 2219/42152; G05B 2219/41418; G05B 2219/41141
See application file for complete search history.

(56) References Cited

U.S. PATENT DOCUMENTS

| | | | | |
|---|---|---|---|---|
| 5,936,366 A * | 8/1999 | Hamamura | ........... | G05B 13/024 318/560 |
| 6,060,854 A * | 5/2000 | Yutkowitz | ............ | G05B 19/404 318/574 |
| 6,677,722 B2 * | 1/2004 | Hamamura | .......... | G05B 13/042 318/572 |
| 7,915,848 B2 * | 3/2011 | Iwashita | ................ | G05B 19/19 318/560 |
| 2006/0186845 A1 * | 8/2006 | Terada | ................... | G05B 19/19 318/432 |
| 2013/0173026 A1 * | 7/2013 | Kawana | ............... | G05B 19/416 700/30 |

FOREIGN PATENT DOCUMENTS

| JP | 2006-018431 | 1/2006 |
|---|---|---|
| JP | 2015-230617 | 12/2015 |

\* cited by examiner

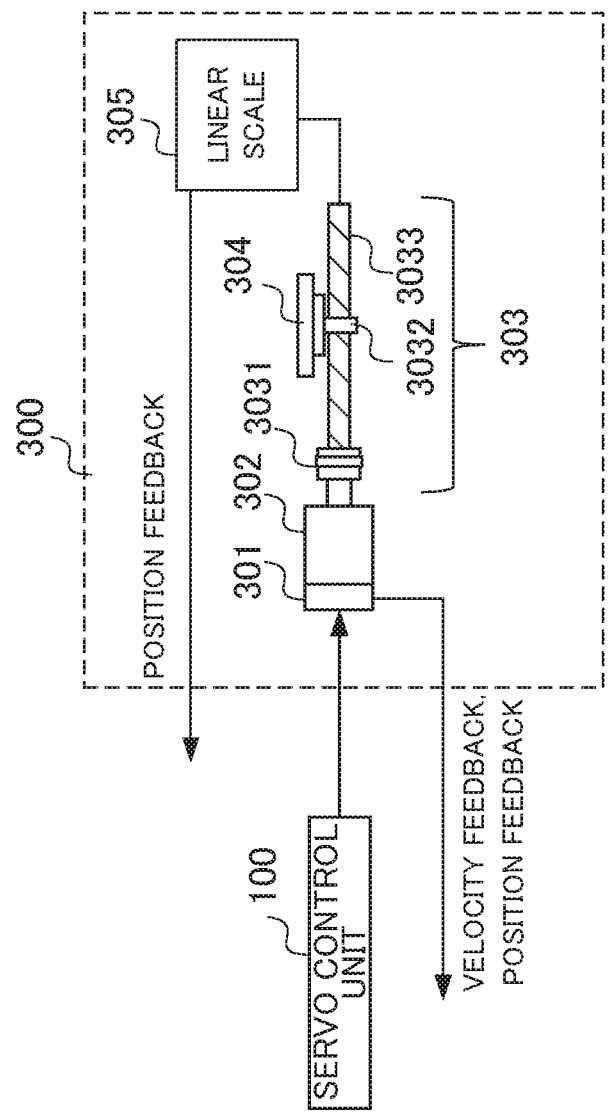

MACHINE LEARNING DEVICE, SERVO CONTROL DEVICE, SERVO CONTROL SYSTEM, AND MACHINE LEARNING METHOD

This application is based on and claims the benefit of priority from Japanese Patent Application No. 2017-049608, filed on 15 Mar. 2017, the content of which is incorporated herein by reference.

BACKGROUND OF THE INVENTION

Field of the Invention

The present invention relates to a machine learning device that performs learning related to coefficients in velocity feedforward control, with respect to a servo control device using the velocity feed forward control; a servo control device and a servo control system including the machine learning device; and a machine learning method.

Related Art

A servo control device using velocity feedforward control is disclosed in, for example, Patent Document 1. The servo control device disclosed in Patent Document 1 is a servo control device that differentiates a position command to determine a position feedforward control amount, adds the position feedforward control amount to a control amount obtained by position loop control to determine a velocity command, and adds the velocity feedforward control amount obtained by differentiating the position feedforward control amount to a value obtained by velocity loop control to determine an electric current command.

Patent Document 1: Japanese Unexamined Patent Application, Publication No. H03-15911

SUMMARY OF THE INVENTION

In a servo control device, there is a case where position error is generated when a velocity command value changes due to influence of nonlinear characteristics such as machine friction, machine rattling, and lost motion. In such case, by setting velocity forward to be highly ordered, the position error is reduced, and followability with respect to a position command is improved. However, adjustment of a coefficient (parameter) of speed feedforward becomes difficult.

An object of the present invention is to provide: a machine learning device that performs reinforcement learning capable of avoiding troublesome adjustment of highly ordered coefficients of velocity feedforward when the coefficients of the velocity feedforward is set to be highly ordered in order to improve followability with respect to a position command by reducing position error, in a servo control device using the velocity feedforward control; a servo control device including the machine learning device; a servo control system; and a machine learning method.

(1) A machine learning device (for example, a machine learning device 200 described later) according to the present invention is a machine learning device that performs machine learning with respect to a servo control device (for example, a servo control device 100 described later) including a velocity feedforward calculation means (for example, a velocity feedforward calculation unit 110 described later) configured to create a velocity feedforward value on the basis of a position command, the machine learning device including: a state information acquisition means (for example, a state information acquisition unit 201 described later) configured to acquire from the servo control device, state information including a servo state including at least position error, and combination of coefficients of a transfer function of the velocity feedforward calculation means, by causing the servo control device to execute a predetermined machining program; an action information output means (for example, an action information output unit 203 described later) configured to output action information including adjustment information of the combination of coefficients included in the state information, to the servo control device; a reward output means (for example, a reward output unit 2021 described later) configured to output a reward value in reinforcement learning based on the position error included in the state information; and a value function updating means (for example, a value function updating unit 2022 described later) configured to update an action value function on the basis of the reward value output by the reward output means, the state information, and the action information.

(2) In the machine learning device according to (1) described above, the reward output means may output the reward value on the basis of an absolute value of the position error.

(3) In the machine learning device according to (1) or (2) described above, the reward output means may calculate the reward value based on a value including at least the position error, and a differential value of the position error.

(4) In the machine learning device according to (1) or (2) described above, the state information acquisition means may further observe time T from when a velocity command value included in the servo state changes to when the position error is within a predetermined range, and
the reward output means may calculate the reward value on the basis of a value including at least the position error and a length of the time T.

(5) In the machine learning device according to (1) or (2) described above, the state information acquisition means further acquires a torque command from the servo control device, and
the reward output means may calculate the reward value on the basis of a value including at least the position error, and a differential value of the torque command.

(6) In the machine learning device according to (1) or (2) described above, the state information acquisition means further acquires a torque command from the servo control device, and
the reward output unit may calculate the reward value on the basis of at least the position error and whether the torque command reaches an allowance of the torque command.

(7) In the machine learning device according to (1) or (2) described above, the state information acquisition means further acquires a velocity error from the servo control device, and
the reward output means may calculate the reward value on the basis of a value including at least the position error, and the velocity error.

(8) The machine learning device according to any of (1) to (7) described above, may include an optimizing action information output means (for example, an optimizing action information output unit 205 described later) configured to generate and output combination of coefficients of the transfer function of the velocity feedforward calculation means, on the basis of a value function updated by the value function updating means.

(9) A servo control system according to the present invention is a servo control system including: the machine learning device according to any of (1) to (8) described above; and a servo control device having a velocity feedforward calculation means configured to create a velocity feedforward value on the basis of a position command.

(10) A servo control device according to the present invention is a servo control device including: the machine learning device according to any of (1) to (8) described above; and a velocity feedforward calculation means configured to create a velocity feedforward value on the basis of a position command.

(11) A machine learning method according to the present invention is a machine learning method of a machine learning device that performs machine learning with respect to a servo control device, including a velocity feedforward calculation means configured to create a velocity feedforward value on the basis of a position command, the machine learning method including: acquiring from the servo control device, state information including a servo state including at least position error, and combination of coefficients of a transfer function of the velocity feedforward calculation means by causing the servo control device to execute a predetermined machining program;

outputting action information including adjustment information of the combination of coefficients included in the state information, to the servo control device; and updating an action value function on the basis of a reward value in reinforcement learning, based on the position error included in the state information, the state information, and the action information.

According to the present invention, machine learning can be performed, that is capable of avoiding troublesome adjustment of highly ordered coefficients of velocity feedforward when the coefficients of the velocity feedforward is set to be highly ordered in order to improve followability with respect to a position command by reducing position error, in a servo control device using the velocity feedforward control.

BRIEF DESCRIPTION OF THE DRAWINGS

FIG. 3 is a block diagram showing an example of a control target 300.

DETAILED DESCRIPTION OF THE INVENTION

Embodiments of the present invention will be described in detail below with reference to drawings.

First Embodiment

Figure 1:
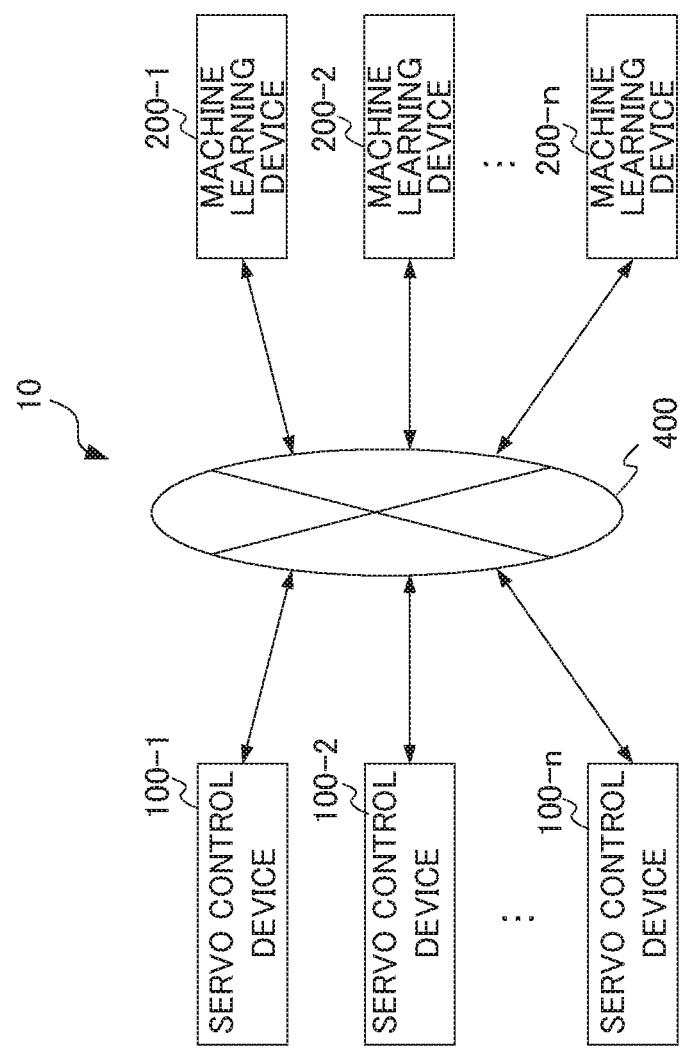
FIG. 1 is a block diagram showing a servo control system of a first embodiment of the present invention.

FIG. 1 is a block diagram showing a servo control system of a first embodiment of the present invention. As shown in FIG. 1, a servo control system 10 includes n servo control devices 100-1 to 100-$n$, n machine learning devices 200-1 to 200-$n$, and a network 400. Note that n is an arbitrary natural number.

Figure 2:
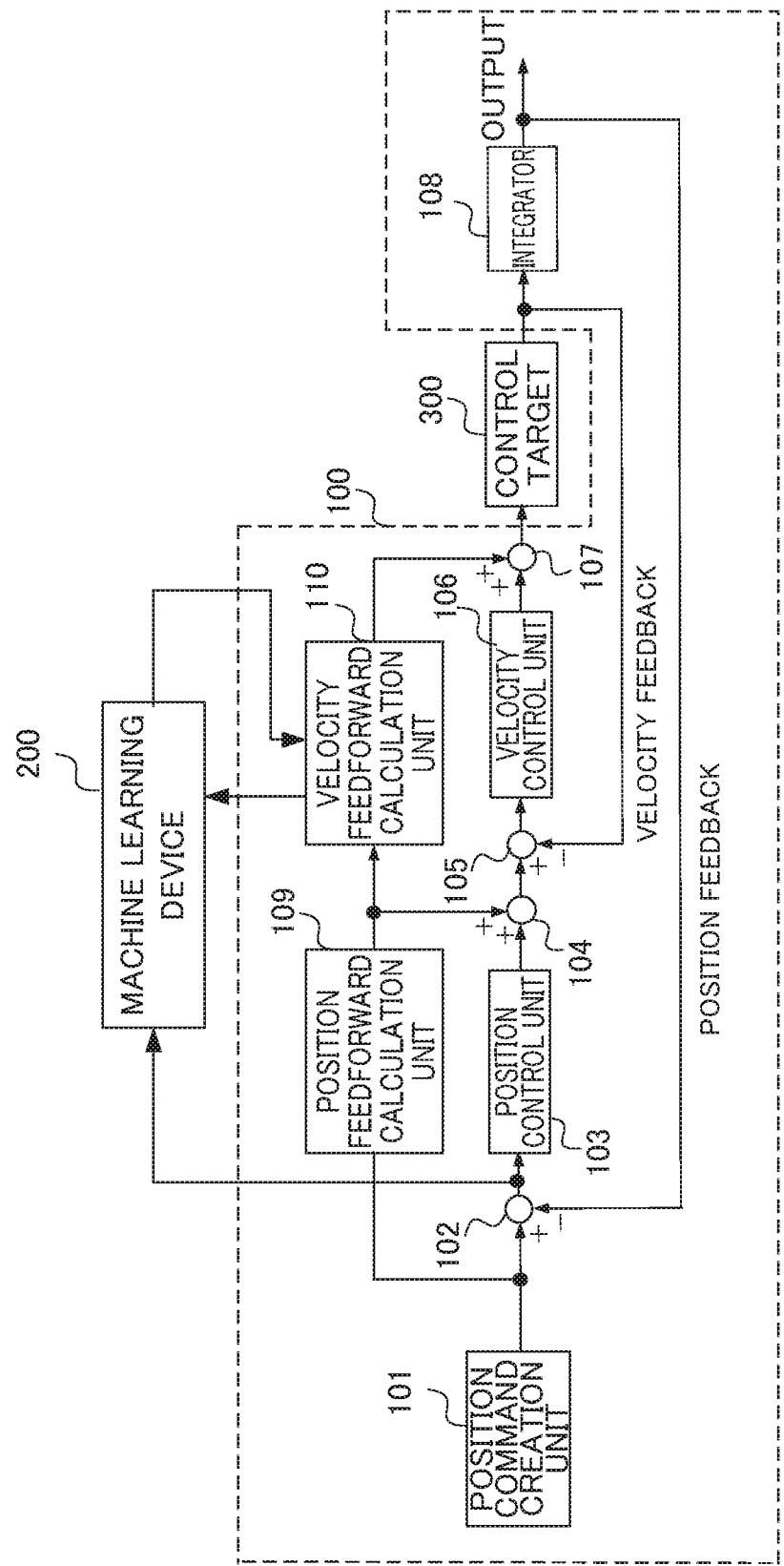
FIG. 2 is a block diagram showing a configuration example in which a servo control device and a machine learning device 200 are connected by a network.

The servo control device 100-1 and the machine learning device 200-1 are considered to be a set of one-to-one, and are communicatively connected. The servo control devices 100-2 to 100-$n$ and the machine learning devices 200-2 to 200-$n$ are connected as similar to the servo control device 100-1 and the machine learning device 200-1. In FIG. 1, n sets of the servo control devices 100-1 to 100-$n$ and the machine learning devices 200-1 to 200-$n$ are connected via the network 400. However, for the n sets of the servo control devices 100-1 to 100-$n$ and the machine learning devices 200-1 to 200-$n$, the servo control devices and the machine learning devices in each of the sets may be directly connected via a connection interface. For example, a plurality of n sets of these servo control devices 100-1 to 100-$n$, and the machine learning devices 200-1 to 200-$n$ may be installed in the same factory, or in different factories. The network 400 is, for example, a local area network (LAN) constructed in a factory, the Internet, a public telephone network, or combination thereof. Particular communication method in the network 400, which of wired connection and wireless connection is used, and the like, are not limited particularly. FIG. 2 is a block diagram showing the set of the servo control device and the machine learning device of the servo control system, and a control target of the first embodiment of the present invention. The servo control device 100 and the machine learning device 200 in FIG. 2 correspond to, for example, the servo control device 100-1 and the machine learning device 200-1 shown in FIG. 1. A control target 300 is, for example, a servo motor, or a machine tool, a robot, or an industrial machine including the servo motor. The servo control device 100 may be provided as a part of a machine tool, a robot, or an industrial machine.

First, the servo control device 100 will be described. The servo control device 100 includes a position command creation unit 101, a subtractor 102, a position control unit 103, an adder 104, a subtractor 105, a velocity control unit 106, an adder 107, an integrator 108, a position feedforward calculation unit 109, and a velocity feedforward calculation unit 110. The position command creation unit 101 creates a position command value to output the created position command value to the subtractor 102, and the position feedforward calculation unit 109. The subtractor 102 determines difference between the position command value and a position detection value obtained by position feedback, to output the difference to the position control unit 103, as position error, and transmit the difference to the machine learning device 200.

The position command creation unit 101 creates the position command value on the basis of a program that operates the control target 300. The control target 300 is, for example, a machine tool including the servo motor. When the machine tool moves a table mounted with a workpiece in an X axis direction and a Y axis direction, and machines the workpiece, the servo control device shown in FIG. 2 is provided with respect to each of the X axis direction and the Y axis direction. When the machine tool moves the table in directions of three or more axes, the servo control device is provided with respect to each of the axis directions. The position command creation unit 101 creates the position command value by setting a feed rate so that a geometry specified by a machining program is obtained.

The position control unit 103 outputs to the adder 104 a value obtained by multiplying a position gain Kp to the position error, as a velocity command value. The position feedforward calculation unit 109 outputs to the adder 104, and the velocity feedforward calculation unit 110, a value obtained by differentiating the position command value and multiplying a feedforward coefficient.

The adder 104 adds the velocity command value, and an output value of the position feedforward calculation unit 109, to output to the subtractor 105, the obtained value as a feedforward controlled velocity command value. The subtractor 105 determines difference between an output of the adder 104, and the velocity detection value obtained by velocity feedback, to output the difference as velocity error, to the velocity control unit 106.

The velocity control unit 106 adds a value obtained by multiplying an integral gain K1v to the velocity error and multiplying, with a value obtained by multiplying a proportional gain K2v to the velocity error, to output obtained value as a torque command value, to the adder 107.

The velocity feedforward calculation unit 110 performs velocity feedforward calculation processing represented by a transfer function Gf(S) represented by formula 1 (shown as formula 1 below), to output obtained value to the adder 107.

$$Gf(s) = \frac{b_0 + b_1 s + b_2 s^2 + \ldots}{a_0 + a_1 s + a_2 s^2 + \ldots} \quad \text{[Formula 1]}$$

The adder 107 adds the torque command value with an output value of the velocity feedforward calculation unit 110 to output obtained value as a feedforward controlled torque command value, to the control target 300.

The control target 300 outputs a velocity detection value, and the velocity detection value is input to the subtractor 105, as the velocity feedback. The velocity detection value is integrated by the integrator 108 to be a position detection value. The position detection value is input to the subtractor 102, as position feedback. The servo control device 100 is configured as described above.

Next, the control target 300 that is controlled by the servo control device 100, will be described. FIG. 3 is a block diagram showing a machine tool including the servo motor, as an example of the control target 300. The servo control device 100 moves a table 304 via a coupling mechanism 303 in a servo motor 302, to machine a workpiece mounted on the table 304. The coupling mechanism 303 has a coupling 3031 coupled to the servo motor 302, and a ball screw 3033 fixed to the coupling 3031. A nut 3032 is screwed into the ball screw 3033. The nut 3032 screwed into the ball screw 3033 is moved in an axis direction of the ball screw 3033, by rotation drive of the servo motor 302.

A rotation angle position of the servo motor 302 is detected by a rotary encoder 301 that is a position detection unit, associated with the servo motor 302. A detected signal is utilized as the velocity feedback. The detected signal is integrated by the integrator 108 to be utilized as the position feedback. As the position feedback, an output of a linear scale 305 that is attached to an end portion of the ball screw 3033, and detects a moving distance of the ball screw 3033, may be used. The position feedback may be generated by using an acceleration sensor.

<Machine Learning Device 200>

The machine learning device 200 performs a preset machining program (herein after, also referred to as a "machining program at the time of learning" to learn the coefficients of the transfer function of the velocity feedforward calculation unit 110. A geometry specified by the machining program at the time of learning is, for example, a circle, a square, and a square with quarter arcs R.

Figure 4A:
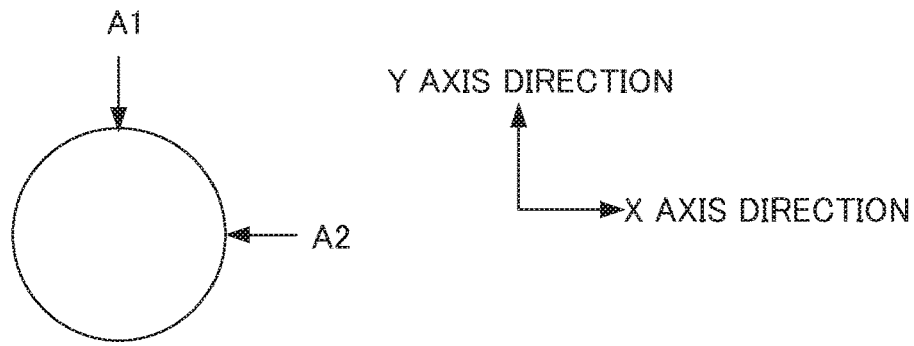
FIG. 4A is a diagram for explaining motion of a servo motor when the geometry is a circle.
Figure 4B:
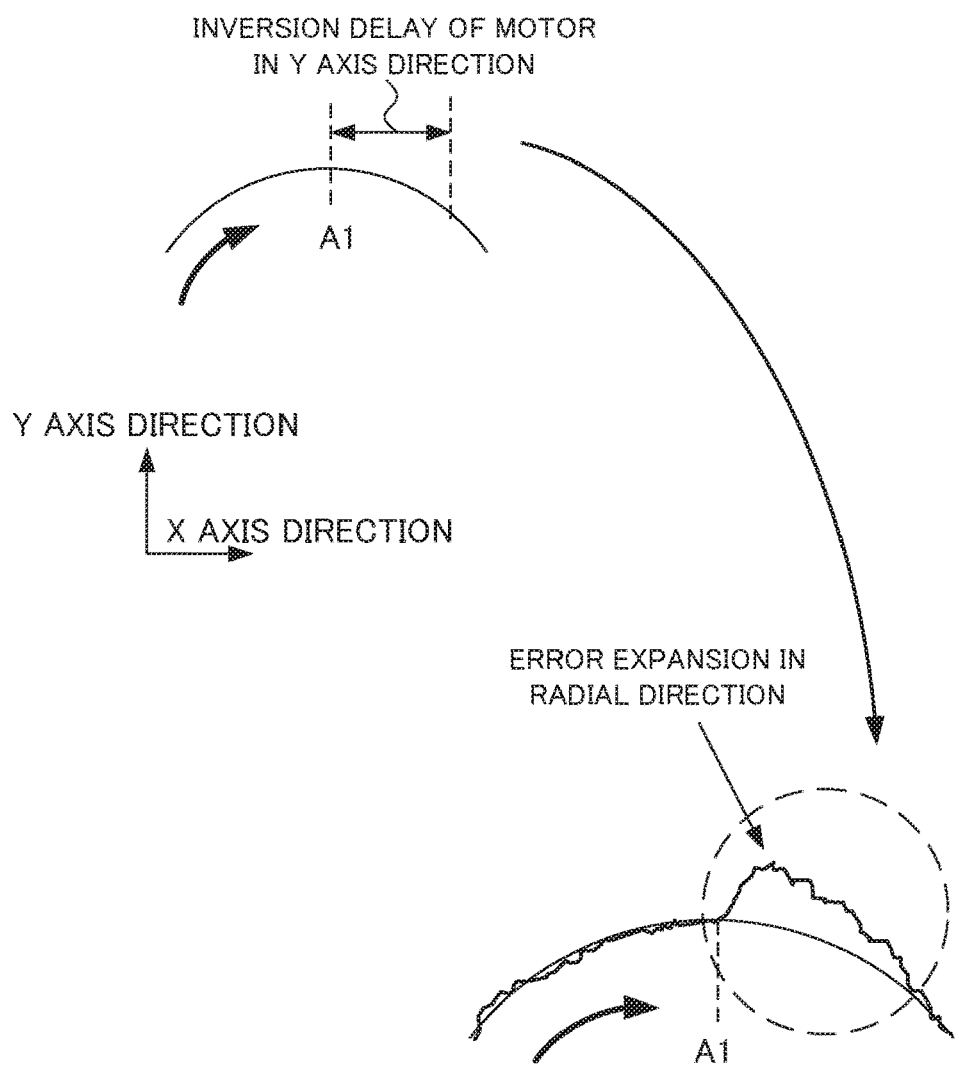
FIG. 4B is an explanatory diagram showing a path error generated due to inertial running at the time when the geometry is a circle, and a rotation direction of the servo motor that moves a table in a Y axis direction attempts to invert in a position A1.
Figure 4C:
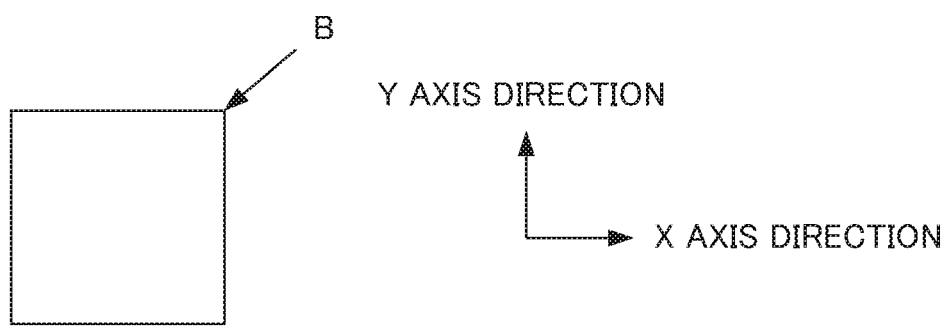
FIG. 4C is a diagram for explaining motion of the servo motor when the geometry is a square.
Figure 4D:
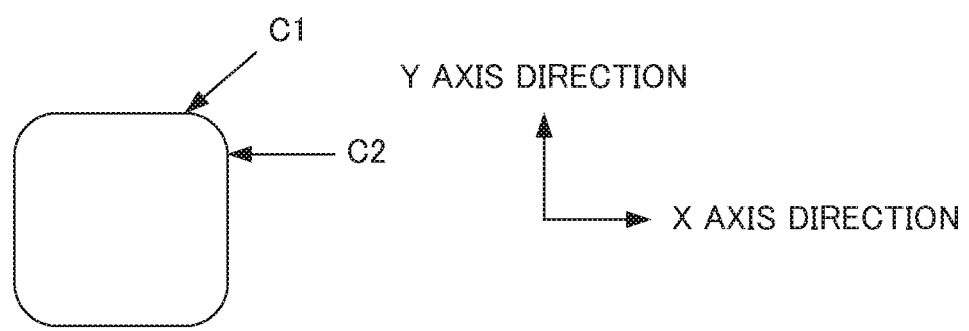
FIG. 4D is a diagram for explaining motion of the servo motor when the geometry is a square with quarter arcs R.

FIG. 4A and FIG. 4B are diagrams for explaining motion of the servo motor when the geometry is a circle. FIG. 4C is a diagram for explaining motion of the servo motor when the geometry is a square. FIG. 4D is a diagram for explaining motion of the servo motor when the geometry is a square with quarter arcs R. In FIG. 4A to FIG. 4D, the table moves so that the workpiece is machined in a clockwise direction.

When the geometry is a circle, as shown in FIG. 4A, the rotation direction of the servo motor that moves the table in the Y axis direction, inverts in a position A1, and the table moves so as to linearly invert in the Y axis direction. In a position A2, the rotation direction of the servo motor that moves the table in the X axis direction inverts, and the table moves so as to linearly invert in the X axis direction. FIG. 4B is an explanatory diagram showing a path error generated due to inertial running when the geometry is a circle, and the rotation direction of the servo motor that moves the table in the Y axis direction attempts to invert, in the position A1. As shown in FIG. 4B, when the rotation direction of the servo motor that moves the table in the Y axis direction attempts to invert in the position A1, inversion delay occurs, and the path error expands in a radial direction. When the path error is expanded and displayed, the path error is seen as a projection.

When the geometry is a square, as shown in FIG. 4C, the servo motor that moves the table in the Y axis direction makes a transition from stopping to rotation motion in a position B, the servo motor that moves the table in the X axis direction makes a transition from rotation to stopping, and the table makes a transition from linear motion in the X axis direction to linear motion in the Y axis direction.

When the geometry is a square with quarter arcs R, as shown in FIG. 4D, the servo motor that moves the table in the Y axis direction makes a transition from stopping to rotation motion in a position C1, and the table makes a transition from the linear motion in the X axis direction to arc motion. The servo motor that moves the table in the X axis direction makes a transition from rotation to stopping in a position C2, and the table makes a transition from the arc motion to linear motion in the Y axis direction. By the geometry specified by the machining program at the time of learning described above, inertial running (inertially moving) that occurs when the rotation direction inverts, a transition is made from rotation state to stopping, and the like, is evaluated, and influence on the position error is checked.

When the machining program at the time of learning is executed, the position command creation unit 101 of the servo control device 100 outputs the position command value so that the geometry is a circle, a square, a square with quarter arcs R, sequentially. The position command creation unit 101 changes the feed rate for every geometry that is a circle, a square, and a square with quarter arcs R, and enables learning also the influence on a plurality of feed rates. The position command creation unit 101 may change the feed rate in a middle of moving of a shape of the geometry, for example, when the table passes a corner in moving the table into a square geometry.

Before each function block included in the machine learning device 200 is described, first, the basic mechanism of the reinforcement learning will be described. An agent (corresponding to the machine learning device 200 in the present embodiment) observes an environmental state, and selects one action. Then, the environment changes on the basis of the action. The agent calculates some rewards according to the environmental change, to learn selection (decision) of better action. While learning with a teacher presents a complete correct, the reward in the reinforcement learning often presents a fragmental value based on change of part of the environment. Thus, the agent learns to select an action so that the total reward in the future is the maximum.

In this way, in the reinforcement learning, by learning an action, a suitable action is learned in consideration of the mutual effect of the action with the environment, that is, an action for maximizing the reward to be obtained in the future is learned. This represents that, in the present embodiment, an action that affects the future, for example, selecting action information for reducing position error, is gained.

As the reinforcement learning, an arbitrary learning method is used. In the description below, a case where Q-learning is used will be described as an example. The Q-learning is a method of learning a value Q (s, a) of selecting an action a, under an environmental state s. An object of the Q-learning is to select the action a having the highest value Q (s, a) as a suitable action, from among actions a that can be taken, in a state s.

However, at the time when the Q-learning is performed for the first time, for combination of the state s and the action a, the correct value of the value Q (s, a) is not identified at all. Thus, the agent selects various actions a under a condition s, and gives a reward with respect to a state change occurred due to the actions a at that time. Then, the agent selects a better action on the basis of the given reward, to learn the correct value Q (s, a).

The agent tries to finally obtain Q (s, a)=E[Σ(γ$^t$)r$_t$], in order to maximize the total reward that can be obtained in the future. E[ ] represents an expected value, t represents time, γ represents a parameter called a discount rate described later, r$_t$ is a reward at the time t, and Σ represents the total by the time t. The expected value in this formula is an expected value in a case where the state is changed according to the suitable action. However, the suitable action is not clear in a process of the Q-learning. Thus, the agent takes various actions to perform the reinforcement learning while searching. An updating formula of such value Q (s, a) can be represented by, for example, the following formula 2 (shown as formula 2 below).

$$Q(s_{t+1}, a_{t+1}) \leftarrow \quad \text{[Formula 2]}$$
$$Q(s_t, a_t) + \alpha\left(r_{t+1} + \gamma\max_a Q(s_{t+1}, a) - Q(s_t, a_t)\right)$$

In the formula 2 described above, s$_t$ represents an environmental state at the time t, and a$_t$ represents an action at the time t. The state is changed to s$_{t+1}$ by the action a$_t$. r$_{t+1}$ represents reward obtained by the state change. An item added with max is obtained by multiplying γ to the Q value of when the action a having the highest Q value that has been identified at that time, is selected, under the state s$_{t+1}$. The γ is a parameter of 0<γ≤1, and is called a discount rate. α is a learning coefficient, and is in a range of 0<α≤1.

The formula 2 described above represents a method of updating the value Q (s$_t$, a$_t$) of the action a$_t$ in the state s$_t$, on the basis of the reward r$_{t+1}$ sent back as a result of a trial a$_t$. This updating formula represents that the Q (s$_t$, a$_t$) is set to be large when a value max$_a$ Q(s$_{t+1}$, a) of the best action in the next state s$_{t+1}$ by the action a$_t$ is larger than the value Q (s$_t$, a$_t$) of the action a$_t$ in the state s$_t$, while, the Q (s$_t$, a$_t$) is set to be small when the value max$_a$ Q(s$_{t+1}$, a) of the best action in the next state S$_{t+1}$ by the action a$_t$ is smaller. That is, a value in an action in a state is approximated to a value of the best action in the next state by the action. Difference between them changes depending on the discount rate γ and the reward r$_{t+1}$. However, basically, mechanism is such that a value of the best action in a state is propagated to a value of an action in a state that is one before that state.

In the Q-learning, there is a method of learning by creating a table of the Q (s, a) for every state action pair (s, a). However, when the values of the Q (s, a) of all state action pairs are determined, the number of states is too large, and there is a case where much time is required for settling the Q-learning.

Thus, the agent may utilize a known technique called a Deep Q-Network (DQN). Particularly, the agent may configure the value function Q by using an appropriate neural network, and adjust a parameter of the neural network, to approximate the value function Q by the appropriate neural network, to calculate the value of the value Q (s, a). The agent can shorten the time required for settling the Q-learning, by utilizing the DQN. The DQN is described in detail, for example, in Non-Patent Document below.

Non-Patent Document

"Human-level control through deep reinforcement learning", Volodymyr Mnihl [online], [searched on Jan. 17, 2017], Internet <URL: http://files.davidqiu.com/research/nature14236.pdf>

The Q-learning described above is performed by the machine learning device 200. Particularly, the machine learning device 200 sets a servo state such as a command and feedback, including values of coefficients a$_i$, b$_j$(i, j≥0) of the transfer function of the velocity feedforward calculation unit 110 in the servo control device 100, and position error information of the servo control device 100 acquired by executing the machining program at the time of learning, as a state s. Then, the machine learning device 200 learns the value Q of selecting adjustment of the coefficients a$_i$, b$_j$ of the velocity feedforward calculation unit 110 related to the state s, as the action a.

The machine learning device 200 observes the state information s including a servo state such as a command and feedback, including at least position error information of the servo control device 100, to determine the action a. The position error information is acquired by executing of the machining program at the time of learning on the basis of the coefficients $a_i$, $b_j$ of the transfer function of the velocity feedforward calculation unit 110. The machine learning device 200 calculates the reward for every time when the action a is performed. The machine learning device 200, for example, searches an optimal action a so that the total reward in the future is the maximum, through trial and error. By that, the machine learning device 200 can select the optimal action a (that is, the optimal coefficients $a_i$, $b_j$) of the velocity feedforward calculation unit 110) with respect to the state s including the servo state such as a command and feedback, including the position error information of the servo control device 100 acquired by executing of the machining program at the time of learning on the basis of the coefficients $a_i$, $b_j$ of the transfer function of the velocity feedforward calculation unit 110.

That is, the machine learning device 200 can select the action a with which the value of the value function Q learned by the machine learning device 200 is the maximum, from among the actions a applied to the coefficients $a_i$, $b_j$ of the transfer function of the velocity feedforward calculation unit 110 related to a state s, to select the action a with which the position error obtained by executing of the machining program at the time of learning is the minimum (that is, the coefficients $a_i$, $b_j$ of the velocity feedforward calculation unit 110).

Figure 5:
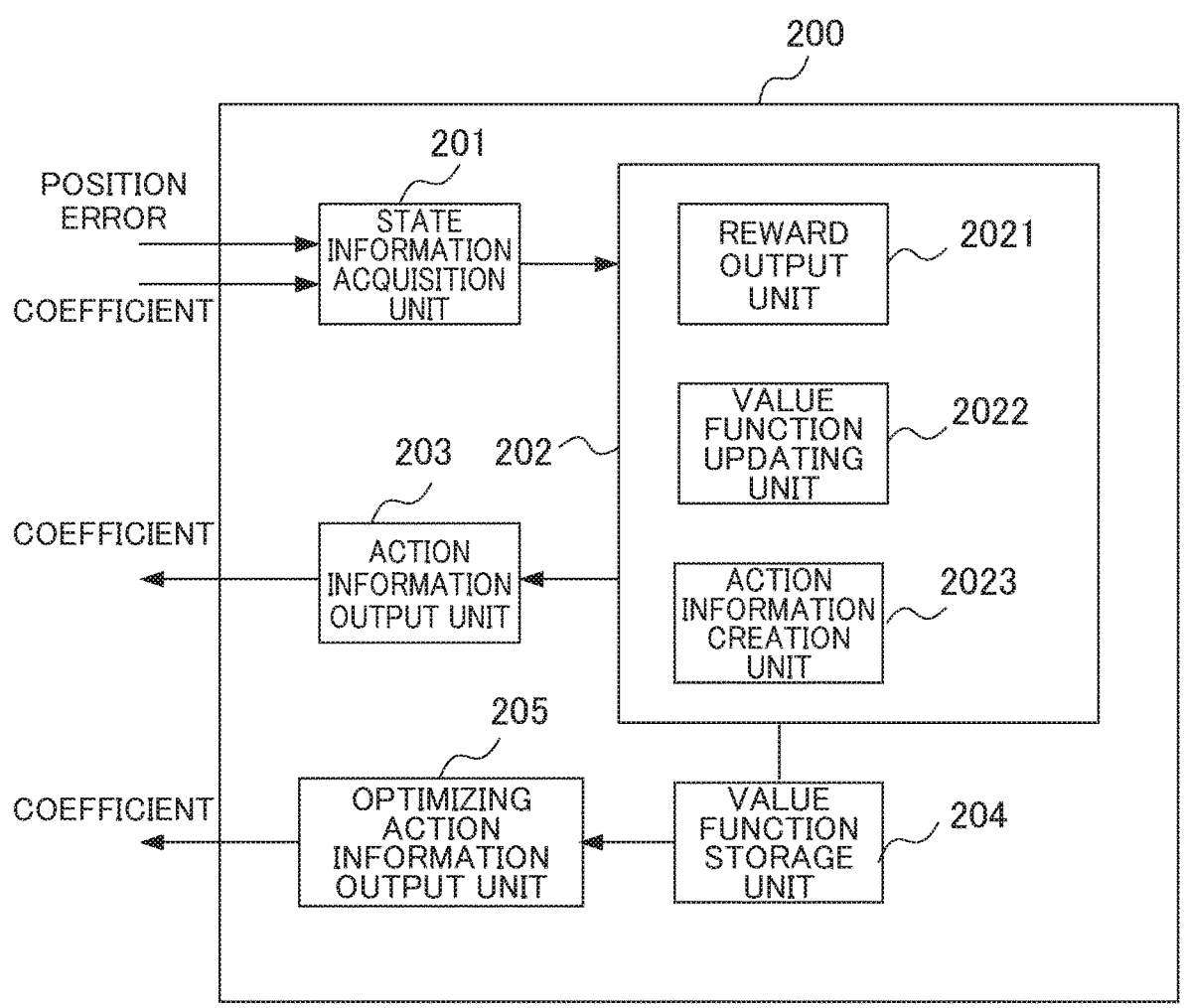
FIG. 5 is a block diagram showing the machine learning device 200 according to the first embodiment.

FIG. 5 is a block diagram showing the machine learning device 200 of the first embodiment of the present invention. In order to perform the reinforcement learning described above, as shown in FIG. 5, the machine learning device 200 includes the state information acquisition unit 201, a learning unit 202, the action information output unit 203, a value function storage unit 204, and an optimizing action information output unit 205. The learning unit 202 includes the reward output unit 2021, the value function value updating unit 2022, and an action information generation unit 2023.

The state information acquisition unit 201 acquires a state s including the servo state such as the command and the feedback, including at least the position error information of the servo control device 100, from the servo control device 100. This state information s corresponds to the environmental state s in the Q-learning. The position error information is acquired by executing of the machining program at the time of learning on the basis of the coefficients $a_i$, $b_j$ of the transfer function of the velocity feedforward calculation unit 110 in the servo control device 100. The state information acquisition unit 201 outputs the acquired state information s to the learning unit 202. A user creates in advance, the coefficients $a_i$, $b_j$ of the velocity feedforward calculation unit 110 at the time when the Q-learning starts for the first time. In the present embodiment, initial set values of the coefficients ai, bj of the velocity feedforward calculation unit 110, created by the user is adjusted to be more optimal value by the reinforcement learning. The coefficients $a_i$, $b_j$ of the velocity feedforward calculation unit 110 are set, for example, as initial set values, to be $a_0=1$, $a_1=0$, $b_0=0$, and $b_1=$(an inertia value of a control target) of formula 1. Dimensions m, n of the coefficients $a_i$, $b_j$ are set in advance. That is, the "i" of the coefficient $a_i$ is set to be $0 \leq i \leq m$, and the "j" of the coefficient $b_j$ is set to be $0 \leq j \leq n$.

The learning unit 202 is a unit that leans the value Q (s, a) of when an action a is selected under an environmental state s. Particularly, the learning unit 202 includes the reward output unit 2021, the value function updating unit 2022, and the action information generation unit 2023.

The reward output unit 2021 is a unit that calculates the reward of when the action a is selected under a state s. A set of position error (position error set) that is a state variable number in the state s is represented by PD(s), and a position error set that is a state variable number related to state information s' that has changed from the state s due to action information a is represented by PD(s'). The action information a is correction information of the coefficients $a_i$, $b_j$ (i and j represent 0 or a positive integer) of the velocity feedforward calculation unit. A value of the position error in the state s is a value calculated on the basis of an evaluation function f (PD(s)) that is set in advance. As the evaluation function f, for example,
a function of calculating an integrated value of an absolute value of the position error
$\int |e| dt$,
a function of calculating an integrated value by weighting the absolute value of the position error, with time
$\int t|e| dt$,
a function of calculating an integrated value of 2n-th (n is a natural number) power of the absolute value of the position error
$\int e^{2n} dt$ (n is a natural number), or
a function of calculating the maximum value of the absolute value of the position error
$Max\{|e|\}$
may be applied.

At this time, when a value f(PD(s')) of the position error of the servo control device 100 that has operated on the basis of the velocity feedforward calculation unit 110 after the correction related to the state information s' corrected by the action information a, is larger than the value f(PD(s)) of the position error of the servo control device 100 that has operated on the basis of the velocity feedforward calculation unit 110 before the correction related to the state information s before the correction by the action information a, the reward output unit 2021 sets a reward value to be a negative value.

On the other hand, when the value f(PD(s')) of the position error of the servo control device 100 that has operated on the basis of the velocity feedforward calculation unit 110 after the correction related to the state information s' corrected by the action information a, is smaller than the value f(PD(s)) of the position error of the servo control device 100 that has operated on the basis of the velocity feedforward calculation unit 110 before the correction related to the state information s before the correction by the action information a, the reward output unit 2021 sets the reward value to be a positive value. When the value f(PD(s')) of the position error of the servo control device 100 that has operated on the basis of the velocity feedforward calculation unit 110 after the correction related to the state information s' corrected by the action information a, is equal to a value f(PD(s)) of the position error of the servo control device 100 that has operated on the basis of the velocity feedforward calculation unit 110 before the correction related to the state information s before the correction by the action information a, the reward output unit 2021 sets the reward value to be zero.

The negative value of when the value f(PD(s')) of the position error of the state s' after performing of the action a, is larger than the value f(PD(s)) of the position error in the prior state s, may be larger according to a ratio. That is, the negative value may be larger according to the degree of increasing of the value of the position error. On the contrary, the positive value of when the value f(PD(s')) of the position error of the state s' after performing of the action a is smaller than the value f(PD(s)) of the position error in the prior state s, may be larger according to a ratio. That is, the positive value may be larger according to the degree of decreasing of the value of the position error.

The value function updating unit 2022 performs Q-learning on the basis of the state s, the action a, the state s' of when the action a is applied to the state s, and the reward value calculated as described above, to update a value function Q that the value function storage unit 204 stores. Updating of the value function Q may be performed by online learning, batch learning, or mini-batch learning. The online learning is a learning method of applying an action a to the current state s to update the value function Q immediately every time when the state s makes a transition to a new state s'. The batch learning is a learning method of applying an action a to the current state s to repeat the transition of the state s to the new state s' to collect learning data and perform updating of the value function Q by using all the collected learning data. Further, the mini-batch learning is an intermediate learning method between the online learning and the batch learning, and is a learning method of performing updating of the value function Q every time when certain pieces of learning data are accumulated.

The action information generation unit 2023 selects the action a in a process of the Q-learning, with respect to the current state s. The action information generation unit 2023 generates the action information a in order to cause operation (corresponding to the action a in the Q-learning) of correcting the coefficients $a_i$, $b_j$ of the velocity feedforward calculation unit of the servo control device 100 in the process of the Q-learning to be performed, to output the generated action information a to the action information output unit 203. More particularly, the action information generation unit 2023, for example, causes adding or subtracting of the coefficients $a_i$, $b_j$ of the velocity feedforward calculation unit included in the action a with respect to the coefficients of the velocity feedforward calculation unit included in the state s, to incremental (for example, about 0.01).

When increasing or decreasing of the coefficients $a_i$, $b_j$ of the velocity feedforward calculation unit 110 are applied, a transition is made to the state s', and a positive reward (reward of positive value) is given, the action information generation unit 2023 may take, as the next action a', a measure of selecting the action a' such that the value of the position error becomes small, such as adding to or subtracting from the incremental as similar to the previous action, with respect to the coefficients $a_i$, $b_j$ of the velocity feedforward calculation unit 110.

On the contrary, when a negative reward (reward of a negative value) is given, the action information generation unit 2023 may take, as the next action a', for example, a measure of selecting the action a' such that the position error is smaller than the previous value, such as subtracting from or adding to the incremental on the contrary to the previous action, with respect to the coefficients $a_i$, $b_j$ of the velocity feedforward calculation unit 110.

The action information generation unit 2023 may take a measure of selecting the action a' by a known method such as the greedy method of selecting the action a' having the highest value Q (s, a) from among values of the action a currently estimated, or the E greedy method of randomly selecting the action a' with a small probability E, and other than that, selecting the action a' having the highest value Q (s, a).

The action information output unit 203 is a unit that transmits the action information a output from the learning unit 202 to the servo control device 100. As described above, the servo control device 100 slightly corrects the current state s, that is, the coefficients $a_i$, $b_j$ of the velocity feedforward calculation unit 110 that are currently set on the basis of the action information, to make a transition to the next state s' (that is, the corrected coefficients of the velocity feedforward calculation unit 110).

The value function storage unit 204 is a storage device that stores the value function Q. The value function Q may be stored in a table (hereinafter, referred to as an action value table) for example, for every state s and every action a. The value function Q stored in the value function storage unit 204 is updated by the value function updating unit 2022. The value function Q stored in the value function storage unit 204 may be shared with the other machine learning devices 200. When the value function Q is shared among a plurality of machine learning devices 200, distributed reinforcement learning can be performed by the machine learning devices 200. Thus, efficiency of the reinforcement learning can be improved.

The optimizing action information output unit 205 creates the action information a (hereinafter, referred to as "optimizing action information") for causing the velocity feedforward calculation unit 110 to perform operation with which the value Q (s, a) is the maximum, on the basis of the value function Q updated by performing of the Q-learning by the value function updating unit 2022. More particularly, the optimizing action information output unit 205 acquires the value function Q stored in the value function storage unit 204. This value function Q is updated by performing of the Q-learning by the value function updating unit 2022 as described above. Then, the optimizing action information output unit 205 creates the action information on the basis of the value function Q to output the created action information to the servo control device 100 (velocity feedforward calculation unit 110). This optimizing action information includes information of correcting the coefficients $a_i$, $b_j$ of the velocity feedforward calculation unit 110, as similar to the action information output in the process of the Q-learning by the action information output unit 203.

In the servo control device 100, the coefficients $a_i$, $b_j$ of the velocity feedforward calculation unit 110 are corrected on the basis of this action information. Accordingly, the servo control device 100 can reduce the value of the position error without performing troublesome adjusting of the coefficients, even when the coefficients of the velocity feedforward are made highly ordered. As described above, by utilizing the machine learning device 200 according to the present invention, the parameter adjustment of the velocity feedforward calculation unit 110 of the servo control device 100 is simplified.

The function blocks included in the servo control device 100, and the machine learning device 200 have been described above. In order to realize these function blocks, each of the servo control device 100 and the machine learning device 200 include an operation processing device such as a central processing unit (CPU). Each of the servo control device 100 and the machine learning device 200 also include a sub storage device such as a hard disk drive (HDD) stored with various control programs such as application software and an operating system (OS), and a main storage device such as a random access memory (RAM) for storing data temporarily required for execution of the program by the operation processing device.

In each of the servo control device 100 and the machine learning device 200, while reading the application software and the OS from the sub storage device, and decompressing the read application software and OS into the main storage device, the operation processing device performs operation processing based on these application software and OS. On the basis of this operation result, various hardware included in the servo control device 100, and devices of the machine learning device 200 are controlled. Thereby, the function blocks of the present embodiment are realized. That is, the present embodiment can be realized by cooperation of the hardware and the software.

The machine learning device 200 performs a large amount of operation associated with the machine learning. Thus, it is desirable that, for example, a personal computer is mounted with graphics processing units (GPUs), and the GPUs are utilized for the operation processing associated with the machine learning by a technique called general-purpose computing on graphics processing units (GPGPU), so that the machine learning device 200 can perform high speed processing. Further, in order to perform higher speed processing, a plurality of such computers mounted with the GPU may be used to construct a computer cluster, so that parallel processing is performed by the plurality of computers included in the computer cluster.

Figure 6:
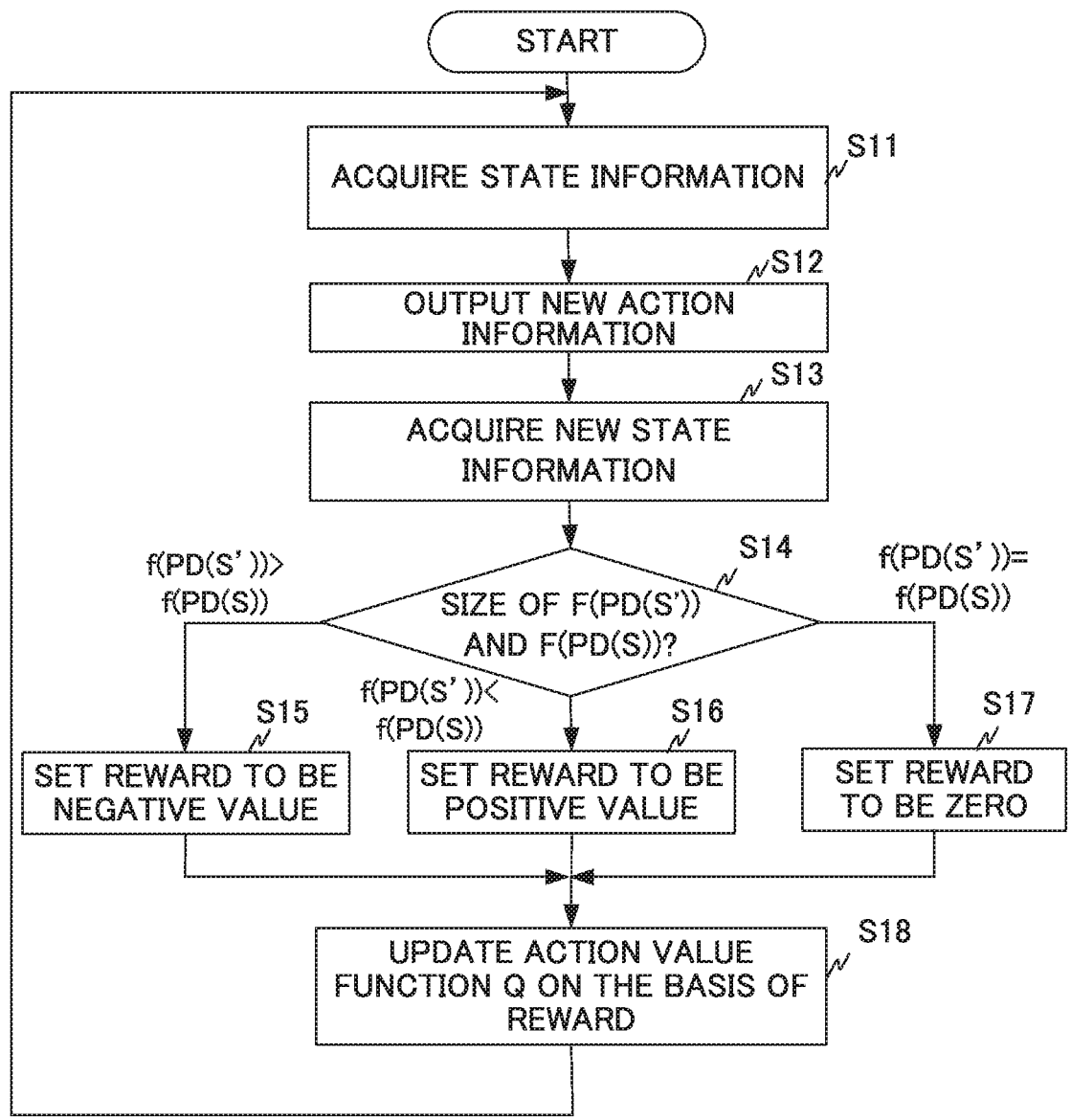
FIG. 6 is a flowchart explaining motion of the machine learning device 200.

Next, operation of the machine learning device 200 at the time of Q-learning in the present embodiment will be described with reference to a flowchart of FIG. 6.

In step S11, the state information acquisition unit 201 acquires the state information s from the servo control device 100. The acquired state information is output to the value function updating unit 2022 and the action information generation unit 2023. As described above, this state information s is information corresponding to a state in the Q-learning, and includes the coefficients $a_i$, $b_j$ of the velocity feedforward calculation unit 110 of at the time of step S11. In this way, a set PD(s) of the position error corresponding to a predetermined feed rate and the geometry that is a circle of when the coefficients are initial values, is obtained from the velocity feedforward calculation unit 110.

As described above, the coefficients $a_i$, $b_j$ of the velocity feedforward calculation unit 110 in the initial state so are, for example, $a_0=1$, $a_1=0$, $b_0=0$, and $b_1=$(an inertia value of a control target).

The value $PD(s_0)$ of the position error in the state so of when the Q-learning starts for the first time, is obtained from the subtractor 102 by operating the servo control device 100 by the machining program at the time of learning. The position command creation unit 101 sequentially outputs the position command while changing the feed rate, in a predetermined geometry specified by the machining program, for example, a geometry that is a circle, a square, or a square with quarter arcs R. For example, the position command value corresponding to the geometry that is a circle is output from the position command creation unit 101 in a predetermined feed rate, and the subtractor 102 outputs a difference between the position command value, and a detection position output from the integrator 108, to the machine learning device 200, as the position error $PD(s_0)$.

In step S12, the action information generation unit 2023 generates new action information a, to output the generated new action information a to the servo control device 100 via the action information output unit 203. The action information generation unit 2023 outputs the new action information a on the basis of the measure described above. The servo control device 100 that has received the action information a drives the machining tool including the servo motor, by the state s' in which the coefficients $a_i$, $b_j$ of the velocity feedforward calculation unit 110 related to the current state s are corrected on the basis of the received action information. As described above, this action information corresponds to the action a in the Q-learning.

In step S13, the state information acquisition unit 201 acquires the position error PD(s') in the new state s' from the subtractor 102, and the coefficients $a_i$, $b_j$ from the velocity feedforward calculation unit 110. In this way, the state information acquisition unit 201 acquires the set PD(s') of the position error corresponding to the predetermined feed rate and the geometry that is a circle, of when coefficients are the coefficients $a_i$, $b_j$ in the state s', from the velocity feedforward calculation unit 110. The acquired state information is output to the reward output unit 2021.

In step S14, the reward output unit 2021 determines size relationship between the value f(PD(s')) of the position error in the state s', and the value f(PD(s)) of the position error in the state s. When it is f(PD(s'))>f(PD(s)), the reward output unit 2021 sets the reward to be a negative value in step S15. When it is f(PD(s'))<f(PD(s)), the reward output unit 2021 sets the reward to be a positive value, in step S16. When it is f(PD(s'))=f(PD(s)), the reward output unit 2021 sets the reward to be zero in step S17. The negative value and the positive value of the reward may be weighted.

When any of step S15, step S16, and step S17 ends, the value function updating unit 2022 updates the value function Q stored in the value function storage unit 204 on the basis of the reward value calculated in any of these steps, in step S18. Then, processing returns to step S11 again, and processing described above is repeated. Thereby, the value function Q settles to a suitable value. The processing described above may end with a condition of being repeated for a predetermined number of times, or being repeated for predetermined time. Although online updating is exemplified for step S18, batch updating or mini batch updating may be performed instead of the online updating.

As described above, by the operation described with reference to FIG. 6, the present embodiment exhibits an effect capable of obtaining a suitable value function for adjustment of highly ordered coefficients $a_i$, $b_j$ of the velocity feedforward by utilizing the machine learning device 200, to simplify optimization of the coefficients $a_i$, $b_j$ of the velocity feedforward. Next, operation at the time of generation of optimizing action information by the optimizing action information output unit 205 will be described with reference to a flowchart of FIG. 7. First, in step S21, the optimizing action information output unit 205 obtains the value function Q stored in the value function storage unit 204. The value function Q has been updated by performing of the Q-learning by the value function updating unit 2022 as described above.

In step S22, the optimizing action information output unit 205 generates the optimizing action information on the basis of the value function Q, to output the generated optimizing action information to the velocity feedforward calculation unit 110 of the servo control device 100.

Figure 7:
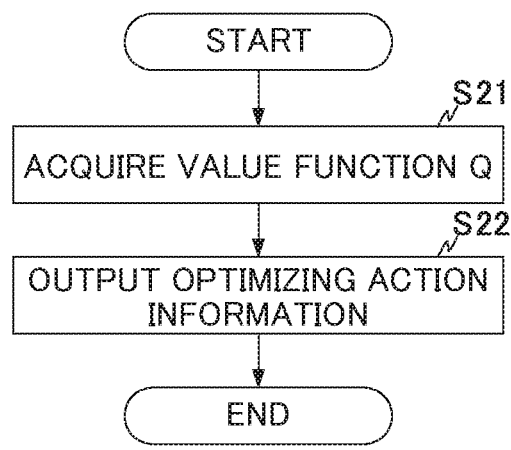
FIG. 7 is a flowchart explaining motion of an optimizing action information output unit 205 of the machine learning device 200.

By operation described with reference to FIG. 7, in the present embodiment, the optimizing action information is generated on the basis of the value function Q determined by learning by the machine learning device 200, and the servo control device 100 adjusts the coefficient $a_i$, $b_j$ of the velocity feedforward calculation unit 110 currently set, on the basis of the optimizing action information. Thereby, the present embodiment can simplify the adjustment of the coefficients $a_i$, $b_j$, and can reduce the value of the position error. In addition, the coefficients of the velocity feedforward are initially set to be highly ordered, the machine learning device 200 performs learning, and thereby, the present embodiment can further reduce the value of the position error.

Second Embodiment

In the first embodiment, the reward output unit 2021 calculates the reward value by comparing the value f(PD(s)) of the position error of the state s calculated on the basis of the evaluation function f(PD(s)) that is set in advance by considering the position error PD(s) in the state s as an input, and a value f (PD(s')) of the position error of the state s' calculated on the basis of the evaluation function f by considering the position error PD(s') in the state s' as an input. However, in calculation of the reward value, other factors than the position error may be added.

Figure 8:
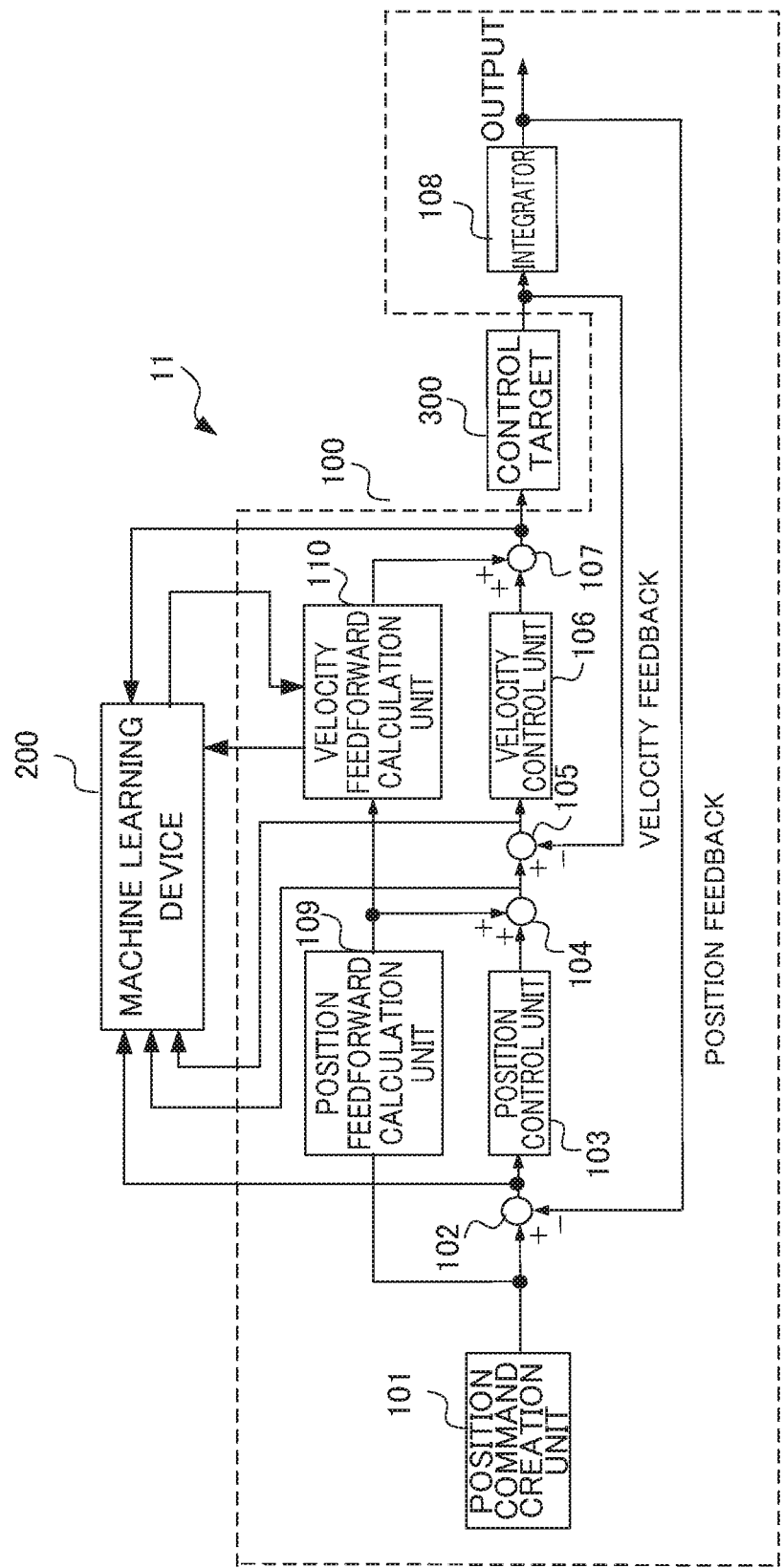
FIG. 8 is a block diagram showing a servo control device of a second embodiment of the present invention.

FIG. 8 is a block diagram showing a servo control system 10A of the second embodiment of the present invention. The difference between the servo control system 10A of the second embodiment, and the servo control system 10 of the first embodiment shown in FIG. 2 is that a velocity command that is an output of the adder 104, and is position forward controlled, a difference between the position forward controlled velocity command and the velocity feedback, and a torque command that is an output of the adder 107, and is position forward controlled, are input to the machine learning device 200, in addition to the position error that is an output of the subtractor 102. FIG. 8 shows, as an example, that all of the position forward controlled velocity command that is to be an output of the adder 104, the difference between the position forward controlled velocity command, and the velocity feedback, and the position forward controlled torque command that is to be an output of the adder 107, are input in the machine learning device 200. However, any one or combination of plurality of them, and the position error may be used for performing the reinforcement learning.

There is a case where shock occurs in a machine even when the position error becomes small. Particularly, when a jerk is large (change in acceleration is large), shock occurs in a machine. In order to reduce the shock in the machine, it is desired that at least one of reducing change in the position error, or reducing change in the torque command value is performed. Thus, the reward may be calculated by at least one of the change in the position error (the differential value of the position error) and the change in the torque command value (the differential value of the torque command value), in addition to the calculation of the reward by the value f(PD(s)) of the position error. Hereinafter, the set of the differential values of the position error in the state s is described as PD'(s). The set of the torque command values in the state s is described as TC(s), and the set of the differential values of the torque command value in the state s is described as TC'(s).

<Differential Value of Position Error>

When the differential value of the position error is considered in the calculation of the reward, an evaluation function g of the differential value of the position error is set in advance. The reward output unit 2021 can compare an evaluation value g(PD'(s)) of the differential value of the position error of the state s, and the evaluation value g(PD'(s')) of the differential value of the position error of the state s', to calculate a second reward based on the differential value of the position error as similar to a case of the position error. As the evaluation function g, as similar to the evaluation function f, for example, a function of calculating the integrated value of the absolute value of the differential value of the position error, a function of calculating the integrated value by weighting the absolute value of the differential value of the position error with time, a function of calculating the integrated value of 2n-th power of the absolute value of the differential value of the position error, or a function of calculating the maximum value of the absolute value of the differential value of the position error, may be used. When the evaluation value g(PD'(s')) of the differential value of the position error in the state s' corrected by the action information a is larger than the evaluation value g(PD'(s)) of the differential value of the position error in the state s before the correction by the action information a, the reward output unit 2021 sets the second reward value to be a negative value.

On the other hand, the evaluation value g(PD'(s')) of the differential value of the position error in the state s' is smaller than the evaluation value g(PD'(s)) of the differential value of the position error in the prior state s, the reward output unit 2021 sets the second reward value to be a positive value. When the evaluation value g(PD'(s')) of the differential value of the position error in the state s' is equal to the evaluation value g(PD'(s)) of the differential value of the position error in the prior state s, the reward output unit 2021 sets the second reward value to be zero.

When the reward calculated on the basis of the evaluation value of the position error that has described in the first embodiment is called a first reward, the reward output unit 2021 performs weighting in between the first reward value and the second reward value, and sums up the weighted first and second reward values to determine the reward with the differential value of the position error considered. The value function updating unit 2022 performs the Q-learning on the basis of the state s, the action a, the state s' of when the action a is applied to the state s, and the reward value with the differential value of the position error considered that has been calculated as described above, to update the value function Q stored in the value function storage unit 204.

<Variation>

Figure 9:
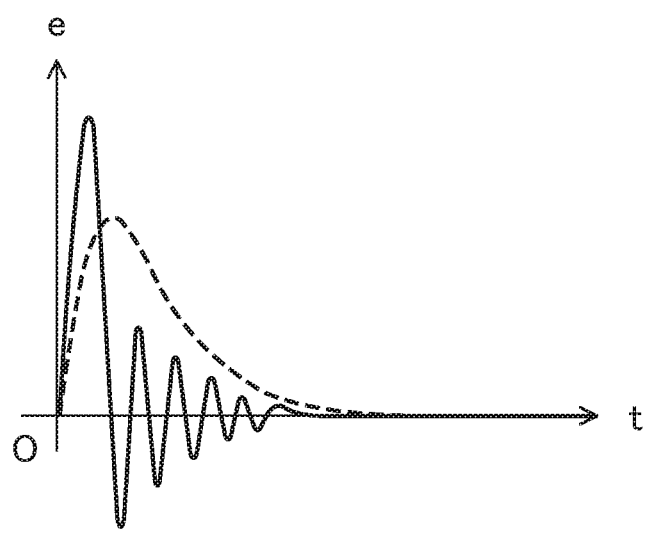
FIG. 9 is a characteristic diagram showing a waveform of position error that may be selected by using an evaluation function weighted and summed up, in a variation.

In the example described above, the reward output unit 2021 performs weighting in between the first reward value and the second reward value, and sums up the weighted first and second reward values. However, the reward output unit 2021 may perform weighting in between the evaluation function f to the absolute value of the position error, and the evaluation function g for the absolute value of the differential value of the position error, to determine the reward by using the summed evaluation functions. FIG. 9 is a characteristic diagram showing a waveform of the position error that can be selected by using the evaluation functions that are weighted and summed. When the position error is represented by e, the evaluation function f for the position error is f=∫|e|dt, and the evaluation function g for the differential value of the position error is g=∫|de/dt|dt, the evaluation function obtained by weighting two evaluation functions f, g, and summing up the functions is c*∫|e|dt+d*∫|de/dt|dt (c and d are weighting coefficients)

It is recognized that, as compared with the waveform shown by a solid line that has the reward value determined on the basis of the evaluation function obtained by weighting and summing, and has a large value of the evaluation function for the differential value of the position error as shown in FIG. 9, the waveform shown by a dotted line that has a small value of the evaluation function for the differential value of the position error, is selected.

<Differential Value of Torque Command Value>

In calculation of the reward, when the differential value of the torque command value TC(s) in the state s is considered, an evaluation function h of the differential value TC'(s) of the torque command value is set in advance, the reward output unit 2021 can calculate a third reward based on the differential value of the torque command value as similar to a case of the differential value of the position error on the basis of a value h(TC'(s)) of the differential value of the torque command value. The reward output unit 2021 may perform weighting in between the first reward value and the third reward value, and sum up the weighted first reward and third reward, to determine the reward with the differential value of the torque command value considered. When the differential value of the position error and the differential value of the torque command value are considered, the reward output unit 2021 may perform weighting in among the first reward value, the second reward value, and the third reward value, and sum up the weighted first, second, and third reward values.

<Variation>

As similar to a case of the position error, the reward output unit 2021 may perform weighting in between the evaluation function for the position error, and the evaluation function for the differential value of the torque command value, and sum up the weighted evaluation functions to determine the reward by using the obtained weighted evaluation function. When the differential value of the position error and the differential value of the torque command value are considered, the reward output unit 2021 may perform weighting in among the evaluation function for the position error, the evaluation function for the differential value of the position error, and the evaluation function for the differential value of the torque command value, and sum up the weighted evaluation functions, to determine the reward by using the obtained weight evaluation function.

<Velocity Command Value>

It is preferable that time T from when the velocity command value changes to when the position error is within a range, is as short as possible. Thus, the reward with the time T from when the velocity command value changes to when the position error is within a range, considered, can be calculated in addition to the calculation of the reward by the position error. The state information acquisition unit 201 detects change of the position forward controlled velocity command value that is an output of the adder 104, and observes the time T from when the velocity command value changes to when the position error that is an output of the subtractor 102 is within a predetermined range. Hereinafter, a set of the time T from when the velocity command value changes to when the position error that is an output of the subtractor 102 is within a predetermined range, in the state s is described as T(s). In the calculation of the reward, the time T from when the velocity command value in the state s changes to when the position error that is an output of the subtractor 102 is within a predetermined range is considered, an evaluation function p of the time T(s) is set in advance, and the reward output unit 2021 can calculate a fourth reward based on the time T(s) as similar to a case of the differential value of the position error, on the basis of an evaluation value p(T(s)) of the time T. The reward output unit 2021 may perform weighting in between the first reward value and the fourth reward value, and sum up the weighted first and fourth rewards to determine the reward with time T from when the velocity command value in the state s changes to when the position error that is an output of the subtractor 102 is within a predetermined range, considered.

When combination of any of the differential value of the position error, the differential value of the torque command value, and the time T(s) described above, is considered in the calculation of the reward, the reward output unit 2021, for example, may perform weighting among the first reward value, and the second reward value, the third reward value, and the fourth reward value corresponding to the combination, and sum up the values.

<Variation>

Figure 10:
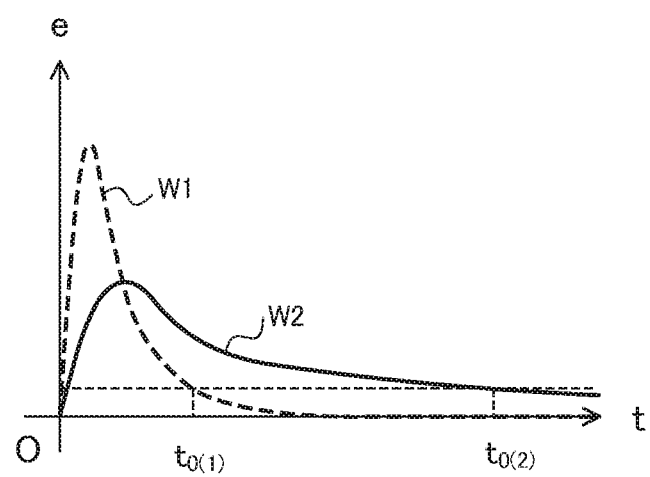
FIG. 10 is a characteristic diagram showing a waveform of position error that may be selected by using an evaluation function weighted and summed up, in another variation.

In the example described above, the reward output unit 2021 performs weighting in between the first reward value and the fourth reward value, and sums up the weighted first and fourth rewards. However, the reward output unit 2021 may perform weighting in between the evaluation function f for the absolute value of the position error, and the evaluation function p for the time T(s), and sum up two weighted evaluation functions, to calculate the reward by using the summed and obtained evaluation function. FIG. 10 is a characteristic diagram showing the waveform of the position error that can be selected by using the weighted and summed evaluation function. When the position error is represented by e, the evaluation function f for the position error is $\int |e| dt$, and the evaluation function p for the time T(s) is $\int t_0 dt$, the weighted and summed evaluation function is $y^* \int |e| dt + z^* \int t_0 dt$ (y and z are weighting coefficients). It is recognized that, when the reward output unit 2021 determines the reward value on the basis of the weighted and summed evaluation function, as shown in FIG. 10, a waveform W1 indicated by a dotted line having smaller time T than a waveform W2 indicated by a solid line, is selected. In FIG. 10, time T is represented as $t_0(1)$, $t_0(2)$ for the waveforms W1, W2, respectively. In the calculation of the reward, when any of the differential value of the position error, the differential value of the torque command value, and the time T(s) described above are combined and considered, the reward output unit 2021 may perform weighting in among the evaluation function for the position error, the evaluation function for the differential value of the position error, the evaluation function for the differential value of the torque command value, and the evaluation function for the time T(s), and sum up the weighted evaluation functions, to determine the reward by using the obtained weighted evaluation function.

<Torque Command Value>

There is an upper limit value for the torque command value. Thus, it is preferable that an allowance TCmax of the torque command value is, for example, set to be a value of the upper limit value or less so that the torque command value does not exceed this allowance TCmax. The reward output unit 2021 calculates the reward by whether or not the torque command value reaches the allowance TCmax, in addition to the calculation of the reward by the position error. Particularly, the state information acquisition unit 201 observes the position forward controlled torque command value TC(s) that is to be an output of the adder 107, in the state s. When the state information acquisition unit 201 observes that even one of the torque command value observed in the state s exceeds the allowance TCmax, the reward output unit 2021 sets the reward to be a negative value irrespective of the value of the first reward, and the torque command value in the prior state.

When the torque command value observed in the state s does not exceed the allowance TCmax, the evaluation function q of the torque command value TC(s) may be set in advance, so that the reward output unit 2021 calculates a fifth reward based on the torque command value TC(s) as similar to a case of the differential value of the position error on the basis of the evaluation value q(TC(s)) of the torque command value TC(s). In that case, the reward output unit 2021 may perform weighting in between the first reward value and the fifth reward value, and sum up the weighted first and fifth rewards. In the calculation of the reward, when any of the differential value of the position error, the differential value of the torque command value, the time T(s) described above, and the torque command value are combined and considered, the reward output unit 2021 may perform weighting in between the first reward value, and the second reward value, the third reward value, the fourth reward value, and the fifth reward value corresponding to the combination, and sum up the weighted first reward value, and second to fifth reward values corresponding to the combination.

<Variation>

The reward output unit 2021 may perform weighting in between the evaluation function for the position error, and the evaluation function q of the torque command value TC(s), and sum up the weighted evaluation functions to determine the reward by using the obtained weighted evaluation function, as similar to a case of the position error. When any of the differential value of the position error, the differential value of the torque command value, and the time T(s), and the torque command value TC(s) are combined and considered, the reward output unit 2021 may perform weighting in among the evaluation function for the position error, the evaluation function for the differential value of the position error, the evaluation function for the differential value of the torque command value, the evaluation function for the time T(s), and the evaluation function of the torque command value TC(s), and sum up the weighted evaluation functions to determine the reward by using the obtained weighted evaluation function.

<Velocity Error>

As the error, there is velocity error in addition to the position error. Even when the position error is small, large velocity error is not preferable. Thus, it is preferable that the machine learning device 200 uses the velocity error in addition to the position error, and sets weighting of the reward value of the position error to be large, to find a velocity feedforward coefficient that makes the position error and the velocity error small. In that case, it is preferable that the reward output unit 2021 calculates a sixth reward by the velocity error in addition to the calculation of the reward by the position error. A set of pieces of the velocity error that are state variable numbers in the state s (velocity error set) is referred to as VD(s). In the calculation of the reward, when the velocity error VD(s) in the state s is considered, an evaluation function u of the velocity error VD(s) is set in advance, and the reward output unit 2021 can calculate the sixth reward based on the velocity error VD(s) as similar to a case of the differential value of the position error on the basis of the evaluation value u(VD(s)) of the velocity error VD(s).

The reward output unit 2021 may perform weighting in between the first reward value, and the sixth reward value, and sum up the values to determine the reward with consideration of the velocity error VD(s) in the state s. In the calculation of the reward, when any of the differential value of the position error, the differential value of the toque command value, the time T(s), the torque command value, and the velocity error VD(s) are combined and considered, the reward output unit 2021 may perform weighting in among the first reward value, and the second reward value, the third reward value, the fourth reward value, the fifth reward value, and the sixth reward value corresponding to the combination, and sum up the values to determine the reward value.

<Variation>

The reward output unit 2021 may perform weighting in between the evaluation function for the position error, and the evaluation function of the velocity error VD(s), and sum up the weighted evaluation functions to determine the reward by using the obtained weighted evaluation function, as similar to the case of the position error. In the calculation of the reward, when any of the differential value of the position error, the differential value of the torque command value, the time T(s), the torque command value TC(s), and the velocity error are combined and considered, the reward output unit 2021 may perform weighting in among the evaluation function for the position error, the evaluation function for the differential value of the position error, the evaluation function for the differential value of the torque command value, the evaluation function for the time T(s), the evaluation function of the torque command value TC(s), and the evaluation function of the velocity error VD(s), and sum up the weighted evaluation functions to determine the reward by using the obtained weighted evaluation function.

As similar to the evaluation function f(PD(s)), as the evaluation functions g(PD'(s)), h(TC'(s)), p(T(s)), q(TC(s)), and u(VD(s)) described in the second embodiment, for example, a function of calculating the integrated value of the absolute value, a function of calculating the integrated value by performing weighting to the absolute value with time, a function of calculating the integrated value of 2n-th power of the absolute value, or a function of calculating the maximum value of the absolute value, may be used.

The servo control unit of the servo control device described above, and each of components included in the machine learning device may be realized by hardware, software or combination thereof. The servo control method performed by cooperation of each of the components included in the servo control device described above, also may be realized by hardware, software, or combination thereof. Being realized by software means being realized by reading and executing a program by a computer.

The program may be stored by using various types of non-transitory computer readable media, and supplied to the computer. The non-transitory computer readable media include various types of tangible storage media. Examples of the non-transitory computer readable media include a magnetic recording medium (for example, a flexible disk, and a hard disk drive), a magneto-optical recording medium (for example, a magneto-optical disk), a CD-ROM (read only memory), a CD-R, a CD-R/W, a semiconductor memory (for example, a mask ROM, a programmable ROM (PROM), an erasable PROM (EPROM), a flash ROM, and a random access memory (RAM).

Although the embodiment described above is a preferable embodiment of the present invention, the scope of the present invention is not limited thereto. The present invention may be performed in an embodiment in which various modifications are performed without departing from the scope of the present invention.

<Variation with Servo Control Device Including Machine Learning Device>

In the embodiment described above, the machine learning device 200 is composed of a different device from the servo control device 100. However, a part or all of functions of the machine learning device 200 may be realized by the servo control device 100.

<Degree of Freedom of System Configuration>

In the embodiment described above, the machine learning device 200 and the servo control device 100 are communicatively connected as a set of one-to-one. However, for example, one machine learning device 200 is communicatively connected with a plurality of servo control devices 100 via the network 400 to perform machine learning of each of the servo control devices 100. At that time, respective functions of the machine learning device 200 may be realized by a distributed processing system in which the functions are distributed in a plurality of servers, as appropriate. The functions of the machine learning device 200 may be realized by utilizing a virtual server function, or the like, in a cloud. When there are a plurality of machine learning devices 200-1 to 200-n corresponding to a plurality of servo control devices 100-1 to 100-n, respectively, of the same type name, the same specification, or the same series, the machine learning devices 200-1 to 200-n may be configured to share learning results in the machine learning devices 200-1 to 200-n. Thereby, more optimal model can be constructed.

EXPLANATION OF REFERENCE NUMERALS

10 Servo control system
100 Servo control device
101 Position command creation unit
102 Subtractor
103 Position control unit
104 Adder
105 Subtractor
106 Velocity control unit
107 Adder
108 Integrator
109 Position feedforward calculation unit
110 Velocity feedforward calculation unit
200 Machine learning device
201 State information acquisition unit
202 Learning unit
203 Action information output unit
204 Value function storage unit
205 Optimizing action information output unit
300 Control target
400 Network

What is claimed is:

1. A machine learning device for performing machine learning with respect to a servo control device comprising a first memory configured to store a predetermined machining program, and a first processor configured to execute the predetermined machining program and control the servo control device to create a velocity feedforward value on the basis of a position command, the machine learning device comprising:
   a second memory configured to store a program; and
   a second processor configured to execute the program to control the machine learning device to:
   acquire from the servo control device, state information including a servo state including at least position error, and a combination of coefficients of a transfer function for creating the velocity feedforward value, by causing the servo control device to perform the predetermined machining program;
   output action information including adjustment information of the combination of coefficients included in the state information, to the servo control device;
   output a reward value in reinforcement learning based on the position error included in the state information; and
   update a value function on the basis of the reward value, the state information, and the action information.

2. The machine learning device according to claim 1, wherein the second processor executes the program to control the machine learning device to output the reward value on the basis of an absolute value of the position error.

3. The machine learning device according to claim 1, wherein the second processor executes the program to control the machine learning device to calculate the reward value based on a value including at least the position error, and a differential value of the position error.

4. The machine learning device according to claim 1, wherein
   the second processor executes the program to control the machine learning device to: observe time T from when a velocity command value included in the servo state changes to when the position error is within a predetermined range, and
   calculate the reward value on the basis of a value including at least the position error and a length of the time T.

5. The machine learning device according to claim 1, wherein
   the second processor executes the program to control the machine learning device to: acquire a torque command from the servo control device, and
   calculate the reward value on the basis of a value including at least the position error, and a differential value of the torque command.

6. The machine learning device according to claim 1, wherein
   the second processor executes the program to control the machine learning device to: acquire a torque command from the servo control device, and
   calculate the reward value on the basis of at least the position error and whether the torque command reaches an allowance of the torque command.

7. The machine learning device according to claim 1, wherein
   the second processor executes the program to control the machine learning device to: acquire velocity error from the servo control device, and
   calculate the reward value on the basis of a value including at least the position error, and the velocity error.

8. The machine learning device according to claim 1, wherein the second processor executes the program to control the machine learning device to generate and output the combination of coefficients of the transfer function for creating the velocity feedforward value, on the basis of the value function updated by the machine learning device.

9. A machine learning method of a machine learning device for performing machine learning with respect to a servo control device to create a velocity feedforward value on the basis of a position command, the machine learning method performed by a computer, the machine learning method comprising the steps of:
   acquiring from the servo control device, state information including a servo state including at least position error, and a combination of coefficients of a transfer function for creating the velocity feedforward value by causing the servo control device to execute a predetermined machining program;
   outputting action information including adjustment information of the combination of coefficients included in the state information, to the servo control device; and
   updating a value function on the basis of a reward value in reinforcement learning, based on the position error included in the state information, the state information, and the action information.

* * * * *